No. 883,172. PATENTED MAR. 31, 1908.
H. P. CORBIN.
WHEEL PAINTING MACHINE.
APPLICATION FILED DEC. 3, 1907.
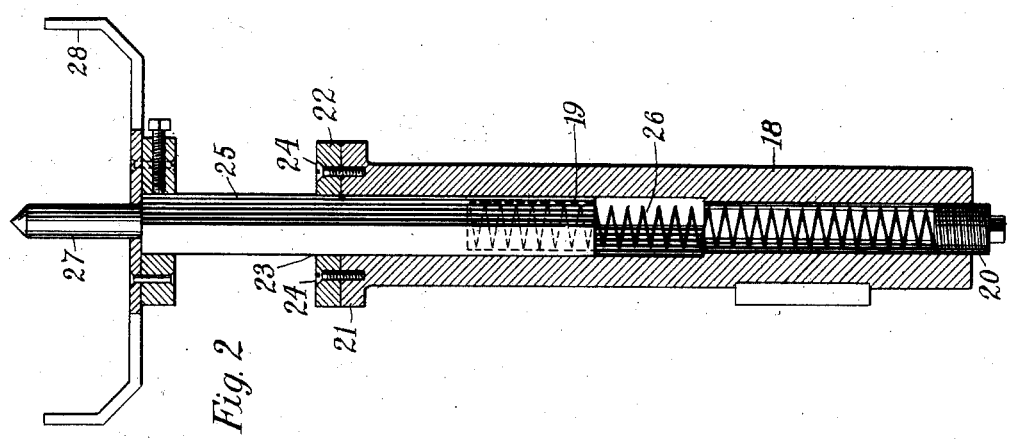
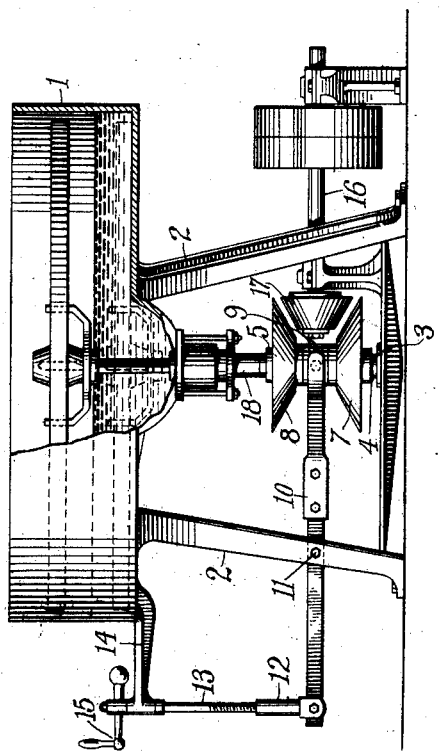
Witnesses
Henry P. Corbin, Inventor
By his Attorney A. M. Pierce

UNITED STATES PATENT OFFICE.

HENRY P. CORBIN, OF MOLINE, ILLINOIS, ASSIGNOR TO C. A. WILLEY COMPANY, OF NEW YORK, N. Y., A CORPORATION OF NEW YORK.

WHEEL-PAINTING MACHINE.

No. 883,172.      Specification of Letters Patent.      Patented March 31, 1908.

Application filed December 3, 1907. Serial No. 404,903.

*To all whom it may concern:*

Be it known that I, HENRY P. CORBIN, a citizen of the United States, residing at Moline, in the county of Rock Island and State of Illinois, have invented certain new and useful Improvements in Wheel-Painting Machines, of which the following is a specification, reference being had therein to the accompanying drawing.

My invention relates especially to that class of devices employed for applying filler, priming, paint, varnish, etc., to vehicle wheels by immersing the wheel in a tank or receptacle, means being provided for lowering the wheel beneath the surface of the coating material, and holding the coated wheel above the said material after applying, and then rotating the wheel to remove surplus material by centrifugal force, and spreading that which adheres uniformly and evenly over the wheel, and has for its object the provision of simple and effective means for lowering and raising the wheel, the present invention being an improvement on the device shown in United States Letters Patent, No. 796,442, issued August 8, 1905 to Edward L. Moran.

To attain the desired end, my invention consists essentially in a wheel supporting spindle for wheel painting machines, in which is comprised a hollow vertical shaft; means for rotating the same; a collar having a square perforation therethrough fixed to the upper extremity of the hollow shaft; a square rod arranged to move longitudinally within the hollow shaft; a spring between the square rod and the bottom of the hollow shaft within said hollow shaft, and a wheel-support mounted on the square rod, all of which will be hereinafter first fully described, and then pointed out in the claims.

In the drawing, Figure 1 is a side elevation of a wheel-painting machine in which my invention is embodied. Fig. 2 is a vertical, axial, sectional view of the wheel-supporting spindle, removed from the machine, on a greatly enlarged scale from Fig. 1.

Similar numerals of reference, wherever they occur, indicate corresponding parts in both figures.

1 is a paint-holder or tank, mounted on supports 2.

3 is a standard whereon is mounted a shaft 4 provided, with a sleeve 5 whereon are located two bevel friction wheels 7 and 8, held against rotation on the sleeve by a feather, and separated by a collar 9 from which extends a rod 10 pivoted to a support at 11. At the outer end of the rod 10 is an internally screwthreaded finger 12 arranged to engage a rotatable rod 13 journaled in a bracket 14, and provided with a manipulating crank 15.

16 is a driving shaft carrying a friction wheel 17, the object of this arrangement being to apply rotary motion, in either direction, to the shaft 4, producing the same results as the mechanism shown in the aforementioned Letters Patent No. 796,442.

18 is a hollow shaft, engaging in the sleeve 5 the hollow therein being of two different diameters, forming a stop 19. The lower extremity of the hollow in the shaft 18 is closed by a plug, 20.

21 is a flange or collar formed with or welded to the upper extremity of the shaft 18, and 22 is a flange or collar having a square perforation 23 therethrough, said collar 22 being secured to the collar 21 by means of screws 24.

25 is a square rod, fitting easily in the perforation 23, the lower portion of said rod being hollowed out for the reception of a spring 26 which finds a support on the plug 20. The upper extremity of the rod 25 carries a wheel-support consisting of a projection 27 for passing into the wheel-hub, and arms 28 which project between the spokes, preventing turning of the wheel on the support.

In use, a wheel is placed in position as indicated in Fig. 1 of the drawing, and then pushed down into the material to be applied thereto, the rod 25 telescoping into the hollow shaft 18; after immersion, pressure on the wheel is released, the spring 26 returning the rod 25 and wheel to above the surface of the coating material when rotation is imparted to the shaft 18, removing the surplus coating material and evenly spreading that which adheres to the wheel.

In the construction shown in the above mentioned patent No. 796,442, the wheel-supporting shaft not only had a rotating movement, but was reciprocated longitudinally through the stuffing box at the bottom of the paint-tank, and the result of this construction and operation was that it was almost impossible to prevent leakage around the shaft. In the present construction there is rotary movement only, in the stuffing box, and leakage is easily prevented. Again, in the old construction, mechanism was required for raising and lowering the wheel-supporting shaft, which is now dispensed with.

Having now fully described my invention, what I claim as new therein, and desire to secure by Letters Patent, is:

1. In a wheel-painting machine, a wheel-supporting spindle in which is comprised a hollow, vertical shaft; means for rotating the same; a collar having a square perforation therethrough fixed to the upper extremity of the hollow shaft; a square rod arranged to move longitudinally within the hollow shaft; a spring between said rod and a stop at the bottom of the hollow shaft; and a wheel-support mounted on the square rod.

2. In a wheel-painting machine, the combination with a tank or receptacle for paint, of a hollow rotatable shaft projecting through the bottom of said receptacle, and a longitudinally movable wheel-supporting rod located within the hollow shaft.

3. In a wheel-painting machine, the combination with a receptacle for paint, of a hollow, vertical, rotatable shaft extending into the bottom thereof, and a spring-controlled, vertically movable wheel-support carried by the hollow shaft.

In testimony whereof I hereunto affix my signature in presence of two witnesses.

HENRY P. CORBIN.

Witnesses:
J. A. FITZPATRICK,
MAUDE M. FITZPATRICK.